United States Patent [19]

Kang

[11] Patent Number: 5,136,806
[45] Date of Patent: Aug. 11, 1992

[54] FLOWERPOT AND WATER SUPPLYING MEMBER FOR FLOWERPOT

[76] Inventor: Young K. Kang, 1076-30, Namhyun-dong, Kwanak-ku,. Seoul, Rep. of Korea

[21] Appl. No.: 565,017

[22] Filed: Aug. 9, 1990

[30] Foreign Application Priority Data

Aug. 31, 1989 [KR] Rep. of Korea ............. 12745/89
Sep. 6, 1989 [KR] Rep. of Korea ............. 13183/89

[51] Int. Cl.$^5$ .......................................... A01G 27/00
[52] U.S. Cl. ............................................... 47/81
[58] Field of Search ..................................... 47/79–83, 47/64, 48.5, 66

[56] References Cited

U.S. PATENT DOCUMENTS

3,857,196 12/1978 Alkire ............................. 47/81
3,987,584 10/1976 Yellin ............................ 47/66
4,829,709 5/1989 Centafanti ....................... 47/81

Primary Examiner—David A. Scherbel
Assistant Examiner—Michele A. Van Patten
Attorney, Agent, or Firm—Kerkam, Stowell, Kondracki & Clarke

[57] ABSTRACT

A flowerpot and a water supplying member for use in a flowerpot are disclosed wherein the flowerpot includes a main body provided with a bottom hole and a supporting leg; a water supplying member for absorbing and carrying water upwardly by capillary action; and a water basin for storing water and for supporting the main body of the flowerpot, wherein the water supplying member includes a retaining tube inserted into the bottom hole of the flowerpot, an absorbing material for absorbing and carrying water upwardly by capillary action, and a supporting plate coupled with the retaining tube in order to support the retaining tube on the bottom of the flowerpot, wherein the water supply into the flowerpot is conveniently accomplished in that the supplying of the water is done consistently and properly even when the flowerpot is not attended to for a considerable number of days.

11 Claims, 3 Drawing Sheets

FLOWERPOT AND WATER SUPPLYING MEMBER FOR FLOWERPOT

FIELD OF THE INVENTION

The present invention relates to a water supplying member for use in a flowerpot, and also relates to a flowerpot employing such a water supplying member, in which the water supplying member is capable of automatically supplying proper amounts of water, based on capillary action, into the soil of the flowerpot for growing a plant.

BACKGROUND OF THE INVENTION

If a plant is to be grown in a flowerpot, the soil of the flowerpot has to have a proper water content, and has to be kept in a proper level of water content. Usually, the sizes of flowerpots are limited, and therefore, keeping the water content level is difficult when supplying water. Therefore, in most cases, a sufficient amount of water is supplied at a given time, and after elapsing of a period, water is supplied again before the soil of the flowerpot is completely dried. The supplying of water to a flowerpot can be different in its amount and period depending on the kind of plant, the size of flowerpot, the water storing capability of the soil, the ambient temperature, and the like, but generally, the water supplying has to be carried out periodically at the intervals of 1 to 3 days.

In the case where large quantities of plants are grown, the water supplying can be carried out by means of a mechanical apparatus, and in such a case, even if the managing person is absent, the water supplying can be automatically conducted.

However, in the case where small quantities of plants are grown with flowerpots in a home, the managing person has to supply water periodically in a manual method. Therefore, if the managing person is out of the home on a touring trip or on a business trip, the plants can be withered to death due to the failure of supplying of water.

Meanwhile, it can be contemplated that a flowerpot is put into a basin containing a certain amount of water as a measure against the failure of periodical water supplying. However, in such a case, the soil will take in and contain too much water, with the result that the air flow through the soil is blocked, and that the roots of the plant are impeded from growing or are decayed. Therefore, when a supplying of water is carried out, it has to be assured that the water supply should not cause a blocking of the air flow through the soil.

SUMMARY OF THE INVENTION

The present invention is intended to overcome the above described disadvantages of the conventional flowerpots. Therefore, it is the object of the present invention to provide a flowerpot and a water supplying member therefor, in which water can be automatically supplied to the soil of the flowerpot even during the absence of the managing person.

In achieving the above object, a water supplying member is installed in and through the bottom of a flowerpot so that the water supplying member will carry water into the soil of the flowerpot through the help of the capillary action.

According to a first preferred embodiment of the present invention, the flowerpot comprises a main flowerpot body containing soil for growing a plant, an absorbing material retaining tube disposed through a hole formed on the bottom of the main body of the flowerpot, and supported on the bottom of the flowerpot, an absorbing material for absorbing water and carrying water upwardly through the help of capillary action, and a supporting plate fixedly secured to the retaining tube and for supporting the retaining tube on the bottom of the main body of the flowerpot.

In the above constitution of the present invention, the absorbing material consists of a fiber bundle or a foamed synthetic resin, which is capable of carrying water to the top after absorbing water by the help of capillary action. An inorganic fiber such as glass fiber or synthetic fiber may be used, for example, in the fiber bundle. It is desirable that the absorbing material is projected to extend above the top of the retaining tube, and that the lower tip of the absorbing material is made even with the lower tip of the retaining tube or projected to extend below the lower tip of the retaining tube.

It is also desirable that the retaining tube is provided with a plurality of through-holes on both its upper portion and lower portion, the upper portion being inserted into the soil of the flowerpot, and the lower portion being dipped into the water reservoir below the bottom of the flowerpot. The outside diameter of the retaining tube is designed to be smaller than the through-hole formed on the bottom of the flowerpot, so that a gap should remain between the retaining tube and the circumference of the through-hole for facilitating air ventilation.

The supporting plate is either integrally formed with the absorbing material retaining tube, or is provided in a detachable form. The supporting plate and the retaining tube can be coupled in a threadable manner or in a slidable manner, but the threadable manner is preferred because the latter is convenient in precisely adjusting the length of the retaining tube projected below the bottom of the flowerpot. The material of the supporting plate may be same as that of the retaining tube, i.e., a synthetic resin because synthetic resin is convenient in carrying out the fabrication and processing. The supporting plate is also provided with a plurality of through-holes so that water and air should flow smoothly through them.

According to another embodiment of the present invention, the device of the present invention comprises an upper flowerpot provided with a through-hole on the bottom thereof, and with a supporting leg on the bottom thereof, a water supplying member including an absorbing material and supported on the bottom of the flowerpot through the through-hole;and a water storing pot for storing water and for supporting the upper flowerpot.

In the case where the supporting leg is formed by downwardly extending the wall of the upper flowerpot in an annular form, the supporting leg will be provided with a plurality of through-holes or slots so that water and air may flow through them.

The water storing pot disposed under the upper flowerpot may be an ordinary basin, or may be specially formed to fit with the leg of the upper flowerpot.

According to still another embodiment of the present invention, the supporting plate of the water supplying member may be formed integrally with the bottom of the flowerpot.

BRIEF DESCRIPTION OF THE DRAWINGS

The above object and other advantages of the present invention will become apparent by describing in detail the preferred embodiments of the present invention with reference to the attached drawings in which.

DESCRIPTION OF THE PREFERRED EMBODIMENT

Figure 1:
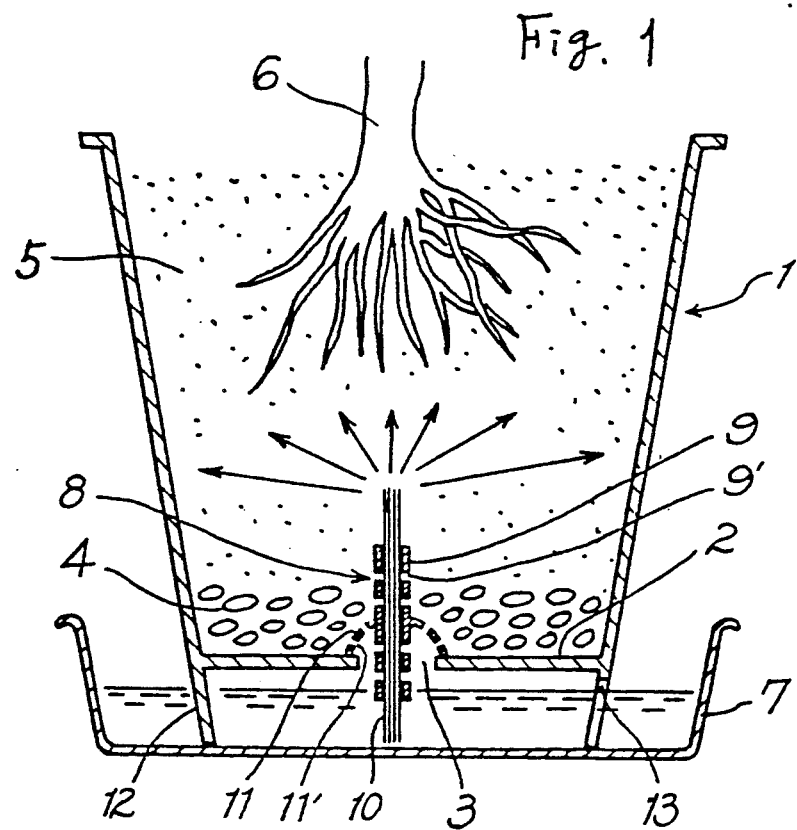
FIG. 1 is a sectional view of the flowerpot of the present invention provided with the water supplying member according to the present invention.
Figure 2:
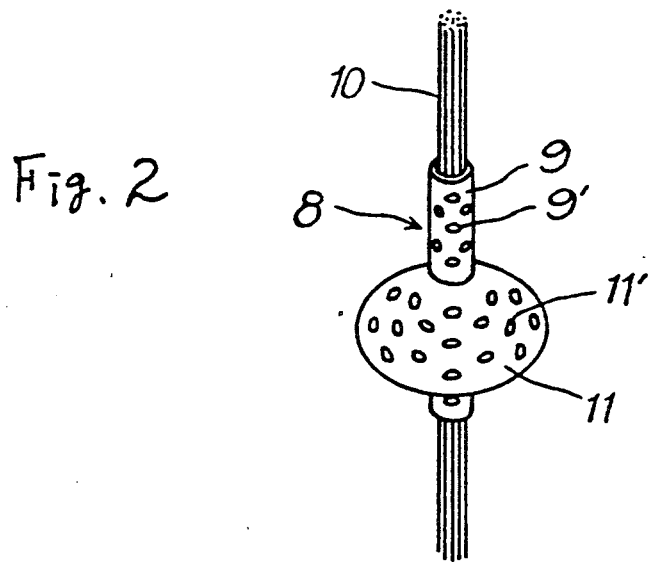
FIG. 2 is a perspective view of the water supplying member according to the present invention.

Referring to FIGS. 1 and 2, the main body of the flowerpot of the present invention is provided with a through-hole 3 on the bottom thereof as is the case with the usual flowerpots. An annular supporting leg 12 provided with a plurality of water flow holes 13 projects from the bottom of the flowerpot, while the main body of the flowerpot contains crude soil 4 in the lower space thereof and fine soil 5 in the upper space thereof, with a plant 6 being planted into the fine soil 5.

A water supplying member 8 according to the present invention is installed through the through-hole 3 formed on the bottom 2 of the flowerpot. The water supplying member 8 comprises an absorbing material retaining tube 9 having a plurality of through-holes 9' on the circumferential wall thereof, an absorbing material 10 comprising a bundle of glass fiber, and a supporting plate 11 having a plurality of through-holes 11' and formed integrally with the retaining tube 9.

The absorbing material 10 is extended up into the fine soil 5, while the lower tip of the absorbing material 10 is extended down to near the bottom of a water basin 7 supporting the flowerpot, so that the lower tip of the absorbing material 10 will preferably be disposed almost even with the tip of the supporting leg 12.

The flowerpot of the present invention constructed as above will now be described as to its operations.

If the flowerpot 1 is mounted upon the water basin 7 which contains water, the water of the water basin 7 is absorbed and carried upwardly through the absorbing material 10 by the help of capillary action so that water may be supplied into the soil, while air flows into the soil through the holes 11' and through the gap formed between the retaining tube 9 and the through-hole 3. When water is carried to the upper portion of the absorbing material 10, the water is supplied into the soil in an adjustable manner. That is, if the soil has a high level of water content, the water is supplied into the soil in extremely small amounts or is not supplied at all, while, if the soil is in a dry condition, large amounts of water are supplied into the soil, so that the water supply will be adjusted and controlled automatically.

Thus, according to the present invention, water is supplied into the soil of the flowerpot in proper amounts even during the absence of the managing person until all the water in the water basin is exhausted, and the air flow through the soil is smoothly carried out, so that the plant will not be decayed or will not be withered to death under normal operating conditions. Further, according to the present invention, no external power is required, and no large water supplying facility is required. Therefore, if water is filled into the water basin, the water supplying can be properly carried out in an effective, consistent manner even during an absence of the managing person or if the flowerpot is not attended to for a considerable number of days, and therefore, the device of the present invention can be conveniently used in homes where a small number of flowerpots are used.

Figure 3:
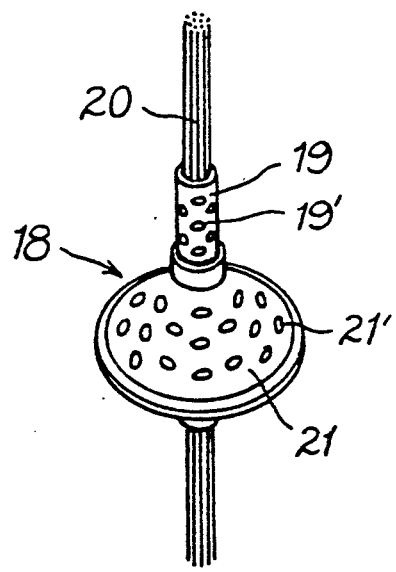
FIG. 3 is a perspective view of the water supplying member in another preferred embodiment of the present invention.
Figure 4:
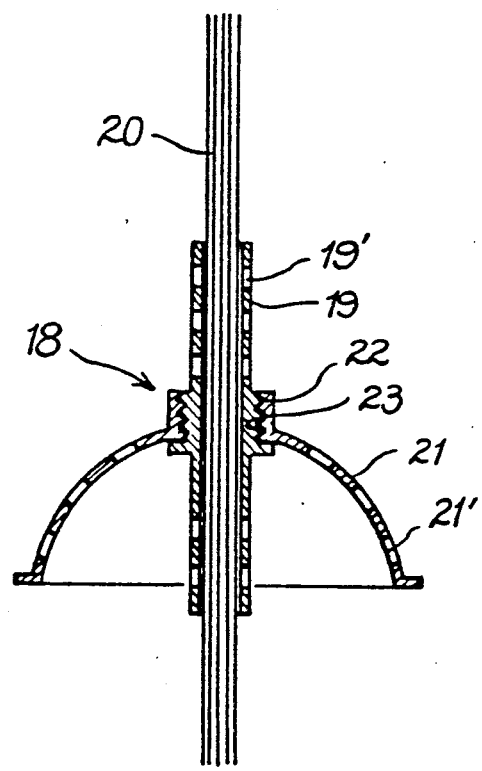
FIG. 4 is a longitudinal sectional view of the device of FIG. 3.

FIGS. 3 and 4 illustrate another embodiment of the water supplying member of the present invention in which the supporting plate and the retaining tube are coupled to each other in a threadable manner. That is, the water supplying member 18 is constructed such that a retaining tube 19 having a plurality of through-holes 19' is provided with a thread section 22 along its outer circumferential surface, a fiber bundle 20 is inserted through the retaining tube 19, and a supporting plate 21 having a plurality of through-holes 21' is provided with a centre hole which is tapped, i.e., provided with a thread section 23 along its inner circumferential surface, so that the thread section 22 of the retaining tube 19 and the associated thread section 23 of the supporting plate 21 can be threadably coupled.

In such a flowerpot, the retaining tube 19 together with the fiber bundle 20 can be adjusted as to their projecting lengths by turning the thread sections 22, 23 relative to each other, and therefore, the water supplying member of this type can be used for any length of the supporting leg of the flowerpot.

Figure 5:
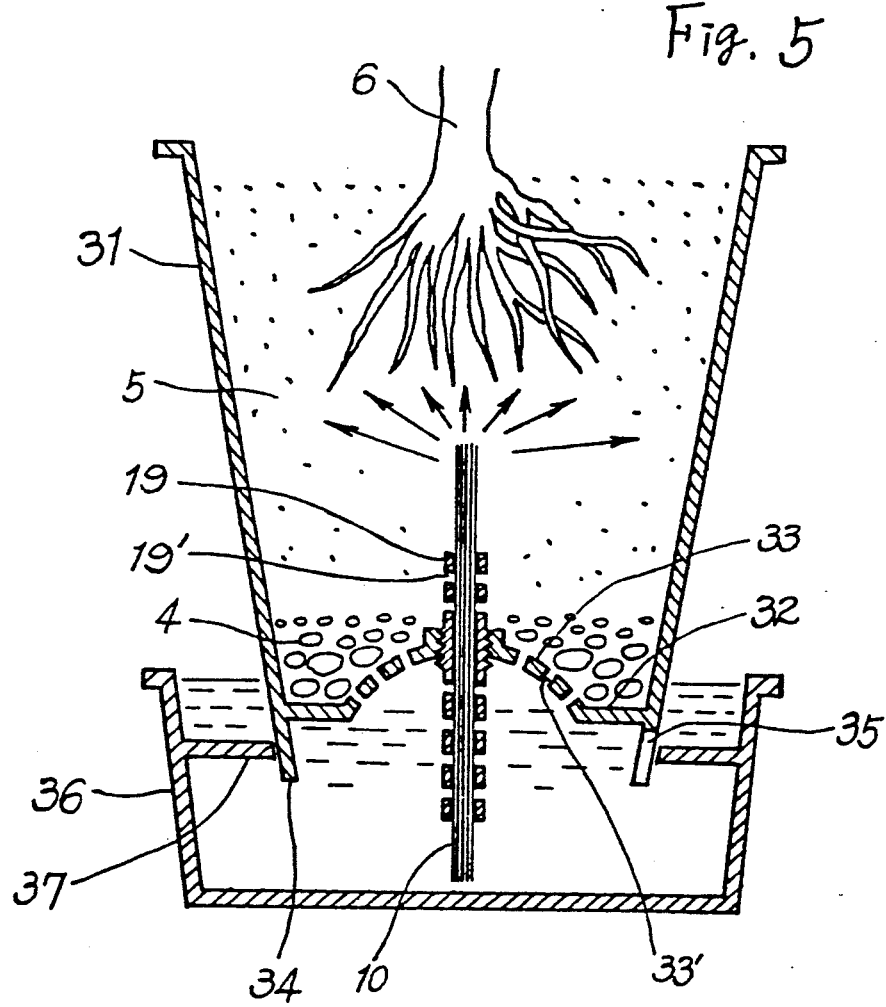
FIG. 5 is a sectional view of the flowerpot in an alternate preferred embodiment of the present invention.

FIG. 5 illustrates still another embodiment of the flowerpot of the present invention. Here, a supporting plate 33 is integrally formed with the bottom 32 of the flowerpot 31, and the supporting plate 33 having a plurality of through-holes 33' is provided with a center hole, and a retaining tube 19 can be detachably coupled with the center hole of the supporting plate 33. Further, a water basin 36 is provided with an annular projection 37, and the inside diameter of this annular projection 37 is designed to be slightly larger than the outside diameter of an annular supporting leg 34 of the flowerpot, so that the tip of the annular supporting leg 34 will not touch the bottom of the water basin when the annular supporting leg 34 is fitted into the annular projection 37.

In this case, a plurality of through-holes or slots can be formed in the annular projection 37 so that air and water can be passed through them. If such a water basin is used, the supporting leg itself will not need to have the through-holes or slots provided therein.

What is claimed is:

1. A water supplying member for use in flowerpot, comprising:

tube means for retaining an absorbing material, said tube means adapted to be inserted through a through-hole formed on a bottom of said flowerpot; an absorbent material means retained within said retaining tube for absorbing and carrying water into the soil of said flowerpot by capillary action; and a supporting plate means coupled with said retaining tube for supporting said retaining tube on the bottom of said flowerpot, said supporting plate means being provided with a plurality of through-holes.

2. A water supplying member as recited in claim 1, wherein said absorbing material comprises a fiber bundle.

3. A water supplying member as recited in claim 2 wherein said fiber bundle comprises glass fiber.

4. A water supplying member as recited in claim 2 wherein said fiber bundle comprises synthetic fiber.

5. A water supplying member as recited in claim 2 wherein said fiber bundle comprises foamed synthetic resin.

6. A water supplying member as recited in claim 1, wherein said supporting plate means is integrally formed with said retaining tube means.

7. A water supplying member as recited in claim 1 wherein said supporting plate means is threadably coupled with said retaining tube means.

8. A flowerpot comprising:
a main body having a through-hole on a bottom thereof, and provided with a cylindrical supporting leg; water supplying means for absorbing and carrying water upwardly in said flowerpot by capillary action; water basin means for storing water and for supporting said main body of said flowerpot, said water basin means being in fluid communication with said water supplying means, wherein said water supplying means comprises an absorbing material retaining tube and an absorbing material retained within said retaining tube for absorbing and carrying water upwardly by capillary action; and a supporting plate having a plurality of through-holes coupled with said retaining tube, said supporting plate being adapted to support said retaining tube on the bottom of said flowerpot.

9. A flowerpot as recited in claim 8, wherein said retaining tube is integrally formed with said supporting plate.

10. A flowerpot as recited in claim 8, wherein said retaining tube and said supporting plate are detachably coupled to each other.

11. A flowerpot as recited in claim 8, wherein said supporting plate having said plurality of through-holes is formed integrally with the bottom of said main body of said flowerpot, and said retaining tube is detachably coupled to said plate at a center hole of said supporting plate.

* * * * *